United States Patent
Ozaki et al.

(10) Patent No.: US 8,922,911 B2
(45) Date of Patent: Dec. 30, 2014

(54) IMAGE PICKUP LENS, IMAGE PICKUP APPARATUS AND PORTABLE TERMINAL

(75) Inventors: Yuichi Ozaki, Hachioji (JP); Kazuki Matsui, Higashiyamato (JP)

(73) Assignee: Konica Minolta Business Technologies, Inc., Tokyo (JP)

( * ) Notice: Subject to any disclaimer, the term of this patent is extended or adjusted under 35 U.S.C. 154(b) by 108 days.

(21) Appl. No.: 13/639,293

(22) PCT Filed: Apr. 5, 2011

(86) PCT No.: PCT/JP2011/058583
§ 371 (c)(1),
(2), (4) Date: Oct. 4, 2012

(87) PCT Pub. No.: WO2011/125999
PCT Pub. Date: Oct. 13, 2011

(65) Prior Publication Data
US 2013/0027604 A1   Jan. 31, 2013

(30) Foreign Application Priority Data
Apr. 7, 2010   (JP) .................................. 2010088492

(51) Int. Cl.
*G02B 9/08* (2006.01)
*G02B 3/02* (2006.01)

(52) U.S. Cl.
USPC ............ 359/739; 359/718; 359/719; 359/809

(58) Field of Classification Search
USPC .......................... 359/718, 719, 738, 739, 809
See application file for complete search history.

(56) References Cited

U.S. PATENT DOCUMENTS

| | | | |
|---|---|---|---|
| 5,999,327 A * | 12/1999 | Nagaoka ........................ | 359/654 |
| 2004/0036983 A1* | 2/2004 | Ninomiya et al. ............. | 359/719 |
| 2004/0179148 A1* | 9/2004 | Nishioka et al. ................ | 349/56 |
| 2005/0105191 A1* | 5/2005 | Baer et al. ...................... | 359/652 |

FOREIGN PATENT DOCUMENTS

| | | |
|---|---|---|
| JP | 4-191716 | 7/1992 |
| JP | 2001-296473 | 10/2001 |
| JP | 2003-5031 | 1/2003 |
| JP | 2003-57538 | 2/2003 |
| JP | 2003-149549 | 5/2003 |

(Continued)

OTHER PUBLICATIONS

English-language International Search Report from the Japanese Patent Office, mailed Jul. 5, 2011, for International Application No. PCT/JP2011/058583.

*Primary Examiner* — Evelyn A. Lester
(74) *Attorney, Agent, or Firm* — Lucas & Mercanti, LLP

(57) ABSTRACT

Disclosed are an image pickup lens which provides a sufficient back focus and can be subjected to a reflow process while offering a capability to be used with either a $\frac{1}{10}$-inch-sized or a $\frac{1}{12}$-inch-sized solid-state image pickup device, as well as an image pickup apparatus and a portable terminal employing such an image pickup lens. An image pickup lens for focusing an image of a subject on a photoelectric converting portion of a solid-state image pickup device, the image pickup lens comprising an aperture stop and a single lens arranged in this order from an object side, wherein the image pickup lens satisfies the following conditional formulae:

$$0.70 \text{ mm} < f < 1.60 \text{ mm} \qquad (1)$$

$$0.70 < (r1+r2)/(r1-r2) < 1.60 \qquad (2)$$

where
  f: focal length of the image pickup lens (mm);
  r1: paraxial radius of curvature of an object-side surface of the single lens (mm); and
  r2: paraxial radius of curvature of an image-side surface of the single lens (mm).

10 Claims, 15 Drawing Sheets

[EXAMPLE 1]

(56) References Cited

FOREIGN PATENT DOCUMENTS

| | | |
|---|---|---|
| JP | 2004-53812 | 2/2004 |
| JP | 2007-10750 | 1/2007 |
| JP | 2007-171785 | 7/2007 |
| JP | 2010-54810 | 3/2010 |
| JP | 4548861 | 7/2010 |

\* cited by examiner

[EXAMPLE 1]

[EXAMPLE 2]

[EXAMPLE 3]

[EXAMPLE 4]

[EXAMPLE 5]

[EXAMPLE 6]

IMAGE PICKUP LENS, IMAGE PICKUP APPARATUS AND PORTABLE TERMINAL

TECHNICAL FIELD

The present invention relates to an image pickup apparatus employing a solid-state image pickup device, such as a CCD image sensor or a CMOS image sensor, and a compact, thin image pickup lens as well as to a portable terminal including the image pickup apparatus.

BACKGROUND ART

Recently, mobile telephones and personal digital assistants provided with an image pickup apparatus employing a solid-state image pickup device like a charge-coupled device (CCD) image sensor or a complementary metal-oxide-semiconductor (CMOS) image sensor have been gaining widespread use. Solid-state image pickup devices used in such image pickup apparatuses have become more compact in recent years. As sensors employing the video graphics array (VGA) image format (with 640×480 effective pixels), ⅒-inch-sized (2.2-μm pixel pitch) and 1/12-inch-sized (1.75-μm pixel pitch) solid-state image pickup devices are commercialized today. This has led to an increased demand for even more compact image pickup lenses to be mounted in image pickup apparatuses.

Single-element image pickup lenses are proposed as image pickup lenses suited to such requirements, because the single-element image pickup lenses are low-cost lenses and can be made more compact.

It has become a trend, these days to use lenses made of resin that are suited to mass production as lenses for forming subject images on the aforementioned image pickup devices in order to achieve a further cost reduction. A requirement for higher performance has also been met by forming resin-made lenses that offer good workability in aspherical shapes. Patent Documents 1 and 2 propose image pickup lenses employing single biconvex lenses as the aforementioned kinds of image, pickup lenses.

CITATION LIST

Patent Documents

Patent Document 1: Japanese Patent Application Publication No. 2007-171785
Patent Document 2: Japanese Patent Application Publication No. 2007-10750

SUMMARY OF INVENTION

Problem to be Solved by Invention

In an image pickup apparatus employing a compact solid-state image pickup device, such as a ⅒-inch-sized or 1/12-inch-sized device, an image pickup lens is also made compact, so that flux of light passed through the lens is narrow as compared to that in conventional image pickup apparatuses. Therefore, when a contaminant like dust adheres to the image pickup lens, there arises a problem that the contaminant will have increased influence on optical performance. An approach to mitigating this problem would be to make the flux of light passed through the lens thicker, and under conditions where lenses having the same F number are used, it would be advisable to increase back focus. In contrast, the lenses proposed by Patent Documents 1 and 2 are biconvex lenses which produce high refractive power on an object-side surface, so that these lenses have a problem that the lenses can not provide a sufficiently long back focus.

The present invention has been devised in light of the aforementioned problems. Accordingly, it is an object of the invention to provide an image pickup lens which provides a sufficient back focus and can be subjected to a reflow process while offering a capability to be used with either a ⅒-inch-sized or a 1/12-inch-sized solid-state image pickup device, as well as an image pickup apparatus and a portable terminal employing such an image pickup lens.

Solution to Problem

An image pickup lens according to claim 1 is for focusing an image of a subject on a photoelectric converting portion of a solid-state image pickup device, the image pickup lens comprising an aperture stop and a single lens arranged in this order from an object side, wherein the image pickup lens satisfies the following conditional formulae:

$$0.70 \text{ mm} < f < 1.60 \text{ mm} \tag{1}$$

$$0.70 < (r1+r2)/(r1-r2) < 1.60 \tag{2}$$

where
 f: focal length of the image pickup lens (mm);
 r1: paraxial radius of curvature of an object-side surface of the single lens (mm); and
 r2: paraxial radius of curvature of an image-side surface of the single lens (mm).

A basic structure of the present invention for obtaining a compact image pickup lens of which aberration is properly corrected includes an aperture stop and a single lens arranged in this order from an object, side. It is possible to achieve both a cost reduction and a size reduction by using the single lens. Additionally, by placing the aperture stop at a location closest to the object, it is possible to locate an exit pupil farther away from an imaging plane, reduce the angle of incidence of principal ray (i.e., the angle between the principal ray and an optical axis) of flux of light focused on a peripheral portion of the imaging plane of a solid-state image pickup device, and obtain a so-called telecentric property. Also, even if a mechanical shutter is needed, it is possible to adopt a structure in which the shutter is located closest to the object, and thus obtain an image pickup lens having a small overall length.

Conditional formula (1) above defines the focal length of an entire image pickup lens system. With a tendency toward smaller solid-state image pickup devices, ⅒-inch-sized and 1/12-inch-sized solid-state image pickup devices are marketed today, and 1/15-inch-sized solid-state image pickup devices are expected to be developed in the future. Also, image pickup lenses of which solid-state image pickup devices have a horizontal angle of view of about 50 to 60 degrees have been required by a number of mobile telephone manufacturers. It is possible to meet the requirement for image pickup lenses featuring a horizontal viewing angle of 60 degrees adopting 1/15-inch-sized solid-state image pickup devices by increasing the focal length to a value larger than a lower limit of conditional formula (1). On the other hand, it is possible to meet the requirement for image pickup lenses featuring a horizontal viewing angle of 50 degrees and adopting ⅒-inch-sized solid-state image pickup devices by decreasing the focal length to a value smaller than an upper limit of conditional formula (1).

Conditional formula (2) above defines the shaping factor of a single lens. It is possible to achieve a desired back focus by increasing the shaping factor to a value larger than a lower limit of conditional formula (2), because the principal point of the single lens is shifted toward an image side. On the other hand, it is possible to avoid an increase in overall length by decreasing the shaping factor to a value smaller than an upper limit of conditional formula (2). Preferably, the following inequality should be satisfied:

$$1.00 \leq (r1+r2)/(r1-r2) < 1.60 \qquad (2')$$

The image pickup lens according to claim 2 in the invention as recited in claim 1, satisfies the following condition:

$$-15° < \theta1 < 10° \qquad (3)$$

where
 θ1: angle of surface inclination (°) at a point of effective radius on the object-side surface of the single lens.

Here, referring to FIG. 1 indicating an object-side surface S1 of the lens, the angle of surface inclination is an angle θ1 formed by a tangent line touching the object-side surface S1 of the lens at the point of effective radius (which is herein designated by P) and a straight line perpendicular to an optical axis X in a flat plane containing the optical axis X, the angle of surface inclination being 0° at the optical axis position and being positive when the object-side surface S1 is convex toward the object. That is, it is negative in the example in FIG. 1.

Conditional formula (3) above defines the angle of inclination of the object-side surface of the single lens. When conditional formula (1) is satisfied, the single lens reduces in size, so that the influence of manufacturing errors on optical performance increases. Especially because the flux of light passing through the object-side surface becomes thicker than on the image side surface, the influence of manufacturing errors becomes greater on the object-side surface than on the image-side surface. When the angle of inclination of the object-side surface is made larger than a lower limit of conditional formula (3), the object-side surface of the single lens becomes a loosely concave surface. This makes it possible to avoid deterioration in performance due to manufacturing errors and obtain sufficient optical performance even when a relative eccentricity of 10 μm occurs between the object-side surface and the image-side surface. On the other hand, it is possible to reduce the risk of occurrence of aberration by decreasing the angle of inclination of the object-side surface to a value smaller than an upper limit of conditional formula (3), because the single lens can be made concentric with respect to the aperture stop on the object side by doing so. Meanwhile, it is preferable to satisfy the following conditional formula:

$$-15° < \theta1 < 0° \qquad (3')$$

The image pickup lens according to claim 3 in the invention as recited in claim 1 or 2, is that the single lens is made of a material having heat resistance.

The material having heat resistance is preferably a material which does not deform at a temperature equal to or higher than 260° C. which is an inside temperature of a reflow tank. When the single lens is configured with a material having heat resistance, the single lens can withstand a reflow process, making it possible to simultaneously mount electronic components and lens modules each including the image pickup lens on each of substrates at low cost and in large quantities.

The image pickup lens according to claim 4 in the invention as recited in any one of claims 1 to 3, is that the single lens is made of energy-curable resin.

The energy-curable resin is used as a material of the image pickup lens, whereby optical performance of the lens does not so deteriorate when exposed to high temperature as compared to lenses using thermoplastic resin like polycarbonate- or polyolefin-based material. Therefore, the use of the energy-curable resin in the image pickup lens is advantageous for the reflow process, and makes it easier and less expensive to manufacture lenses as compared to glass-molded lenses. The use of the energy-curable resin makes it possible to achieve both a cost reduction and large-scale industrial productivity of image pickup apparatuses incorporating image pickup lenses. Incidentally, the energy-curable resin should be construed as referring to either of thermosetting resin and ultraviolet-curable resin.

The image pickup lens according to claim 5 in the invention as recited in claim 4, is that the single lens has a thickness of 1 mm or less on the optical axis.

An image pickup lens using the energy-curable resin generally exhibits greater fluctuations in refractive index than lenses using thermoplastic resin due to absorption of water that occurs when exposed to a high-humidity environment. Therefore, a difference in the refractive index occurs within the lens using the energy-curable resin halfway during a water-absorbing process owing to a difference in the amount of water absorbed by a middle portion and a surface portion of the lens. Thus, the lens using the energy-curable resin tends to be more affected by absorption of water than lenses using thermoplastic resin. The thickness of the single lens of this invention is made 1 mm or less, whereby the difference in the amount of water absorbed by the middle portion and the surface portion of the single lens is reduced. Accordingly, it is possible to suppress fluctuations in the optical performance due to absorption of water by using the single lens made of the energy-curable resin as well. Furthermore, the single lens satisfies the condition that the thickness thereof on the optical axis is equal to or larger than 0.2 mm but not larger than 0.8 mm, whereby it is possible to meet requirements regarding both the processing difficulty and optical performance of the single lens, thereby producing more desirable results.

The image pickup lens according to claim 6 in the invention as recited, in any one of claims 1 to 5, further comprises a parallel plate element located on an image side of the single lens, and satisfies the following conditional formula:

$$0.25 < dc/f < 0.50 \qquad (4)$$

where
 dc: thickness of the parallel, plate element (mm) (wherein dc represents the sum of thicknesses when a plurality of parallel plate elements are provided).

Conditional formula (4) above defines the ratio of the thickness of the parallel plate element to the focal length of the image pickup lens. Because the image pickup lens of this invention is a single lens, there is no lens having negative refractive power. Therefore, there may be a case where it is necessary to take into consideration the occurrence of an image field curvature caused by inadequate correction of the Petzval sum. In this situation, when the parallel plate element is placed on the image side of the single lens and the value dc/f is so defined as to exceed a lower limit of conditional formula (4), it is possible to compensate for the image field curvature while preventing an increase in astigmatism.

Also, it is often the case that a chip scale package (CSP) type device is used as a solid-state image pickup device having reflow withstand capability. The CSP type refers to a solid-state image pickup device in which one side of a sensor is placed in close contact with a parallel plate element and signals are transmitted to and received from the aforementioned circuit board through ball bumps (solder portions) on a reverse side of the solid-state image pickup device that are connected to internal vias through electrodes (refer to Japanese Patent. Application Publication No. 2007-512436). When this CSP type of solid-state image pickup device is used with the value dc/f exceeding the lower limit of conditional formula (4), the parallel plate element that is in close contact with the sensor provides necessary strength as a support member for maintaining mechanical strength of the solid-state image pickup device. Thus, the solid-state image pickup device can be mounted directly on the circuit board without using a connector, making it possible to reduce the device mounting area. On the other hand, it is possible to avoid an increase in the back focus for inserting the parallel plate element by decreasing the value dc/f to a point below an upper limit of conditional formula (4). This makes it possible to avoid an increase in the overall length of the image pickup lens.

The image pickup lens according to claim 7 in the invention as recited in any one of claims 1 to 6, is that fine inorganic particles measuring 30 nanometers or less in size are dispersed in the resin material.

By dispersing the fine inorganic particles measuring 30 nanometers or less in size in the single lens made of an energy-curable resin material, it is possible to reduce deterioration in performance and fluctuations in image position regardless of temperature variations. In addition, it is made possible to provide an image pickup lens having excellent optical characteristics regardless of environmental changes without causing a reduction in light transmittance.

Generally, when fine particles are dispersed in a transparent resin material, light rays are scattered, causing a reduction in light transmittance. It has therefore been difficult to use this kind of material as an optical material. It is however made possible to substantially avoid scattering of light by making the fine particles to a size of smaller than the wavelength of transmitted flux of light.

Additionally, although resin materials have had a drawback in that the materials would provide a low index of refraction as compared to glass materials, it has been found that the refractive index can be increased when fine inorganic particles having a high refractive index are dispersed in a parent resin material. Specifically, it is possible to provide a material having desired temperature dependence by dispersing inorganic particles measuring 30 nanometers or less in size, preferably 20 nanometers or less in size, more preferably 15 nanometers or less in size, in a parent plastic (resin) material.

Furthermore, while the refractive index of a resin material decreases as a result of a temperature increase, it is known that when inorganic particles whose refractive index increases as a result of a temperature increase are dispersed in a parent resin material, these properties of the two materials cancel out each other, making it possible to reduce changes in the refractive index caused by temperature variations. It is also known that when inorganic particles whose refractive index decreases as a result of a temperature increase is dispersed in a parent resin material, on the contrary, it is possible to increase changes in the refractive index caused by temperature variations. Specifically, it is possible to provide a material having desired temperature dependence by dispersing inorganic particles measuring 30 nanometers or less in size, preferably 20 nanometers or less in size, more preferably 15 nanometers or less in size, in a parent plastic (resin) material.

For example, it is possible to obtain a plastic material having a high refractive index and reduce changes in the refractive index caused by temperature variations by dispersing fine particles of aluminum oxide ($Al_2O_3$) or lithium niobate ($LiNbO_3$) in acrylic resin.

Described next in detail are changes in the refractive index A caused by temperature variations. The changes in the refractive index A caused by temperature variations are obtained by differentiating the refractive index n by temperature t as expressed by equation 1 below:

$$A = \frac{(n^2 + 2)(n^2 - 1)}{6n}\left\{(-3\alpha) + \frac{1}{[R]}\frac{\partial [R]}{\partial t}\right\}$$ [Equation 1]

where α is a coefficient of linear expansion and [R] is molecular refraction.

Generally the second term of the above equation contributes so little as compared to the first term of the equation that the second term can be almost disregarded in the case of a resin material.

Here, fine particles, preferably fine inorganic particles, are dispersed in the resin material, so that contribution of the second term of the above equation is substantially increased so as to cancel out a change in the refractive index due to linear expansion of the first term. Specifically, it is preferable to decrease changes in the refractive index due to temperature variations to a value not exceeding $8\times10^{-5}$ (/° C.) in terms of absolute value.

It is also possible to further increase the contribution of the second term so that the single lens has a temperature characteristic that is opposite to that of a parent resin material. Specifically, it is possible to obtain a material of which refractive index does not decrease but increases as a result of a temperature increase.

The ratio of the fine particles mixed may be increased or decreased as appropriate in order to control the rate of change in the refractive index with respect to temperature variations. It is also possible to disperse fine particles obtained by blending multiple kinds of nanometer-sized, fine inorganic particles.

An image pickup apparatus defined in claim 8 is characterized by employing the image pickup lens recited in any one of claims 1 to 7. It is possible to obtain a more compact, high-performance image pickup apparatus by employing the image pickup lens of the present invention.

A portable terminal defined in claim 9 is characterized by comprising the image pickup apparatus recited in claim 8. It is possible to obtain a more compact, high-performance portable terminal by employing the image pickup apparatus of the present invention.

Advantageous Effects of Invention

According to the present invention, it is possible to provide an image pickup lens which provides a sufficient back focus and can be subjected to a reflow process while offering a capability to be used with either a 1/10-inch-sized or a 1/12-inch-sized solid-state image pickup device, as well as an image pickup apparatus and a portable terminal employing such an image pickup lens.

DESCRIPTION OF EMBODIMENTS

Figure 2:
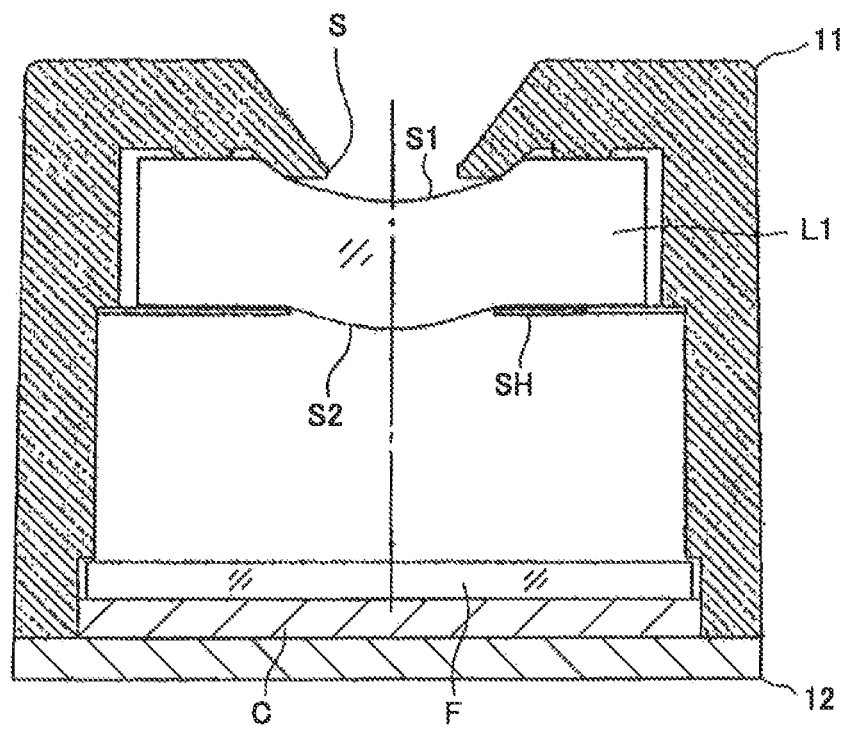
FIG. 2 is a cross-sectional diagram of an image pickup apparatus.

An image pickup lens of the present invention and an image pickup apparatus employing the image pickup lens are described with reference to FIG. 2. The image pickup lens includes an aperture stop S, a positive single lens L1 of which object-side surface S1 is concave (or loosely convex) and image-side surface S2 is convex, and a parallel plate element F made of an optical low-pass filter or an infrared (IR) cut filter or seal glass of a solid-state image pickup device arranged in this order from an object side. The single lens L1 is mounted in a lens frame 11 by means of a light-shielding member SR. The single lens L1 is preferably made of energy-curable resin in which fine inorganic particles measuring 30 nanometers or less in size are dispersed.

An image pickup device C having an imaging plane (photoelectric converting portion) on which an image of a subject is focused through the single lens L1 is of a CSP type, for example, with a ⅒-inch (2.2-μm pixel pitch) or smaller sensor size. The imaging plane of the image pickup device C is in tight contact with the parallel plate element F and a rear surface thereof is mounted on a printed circuit board 12 which is firmly attached to the lens frame 11. The image pickup apparatus is structured as described above.

Figure 3:
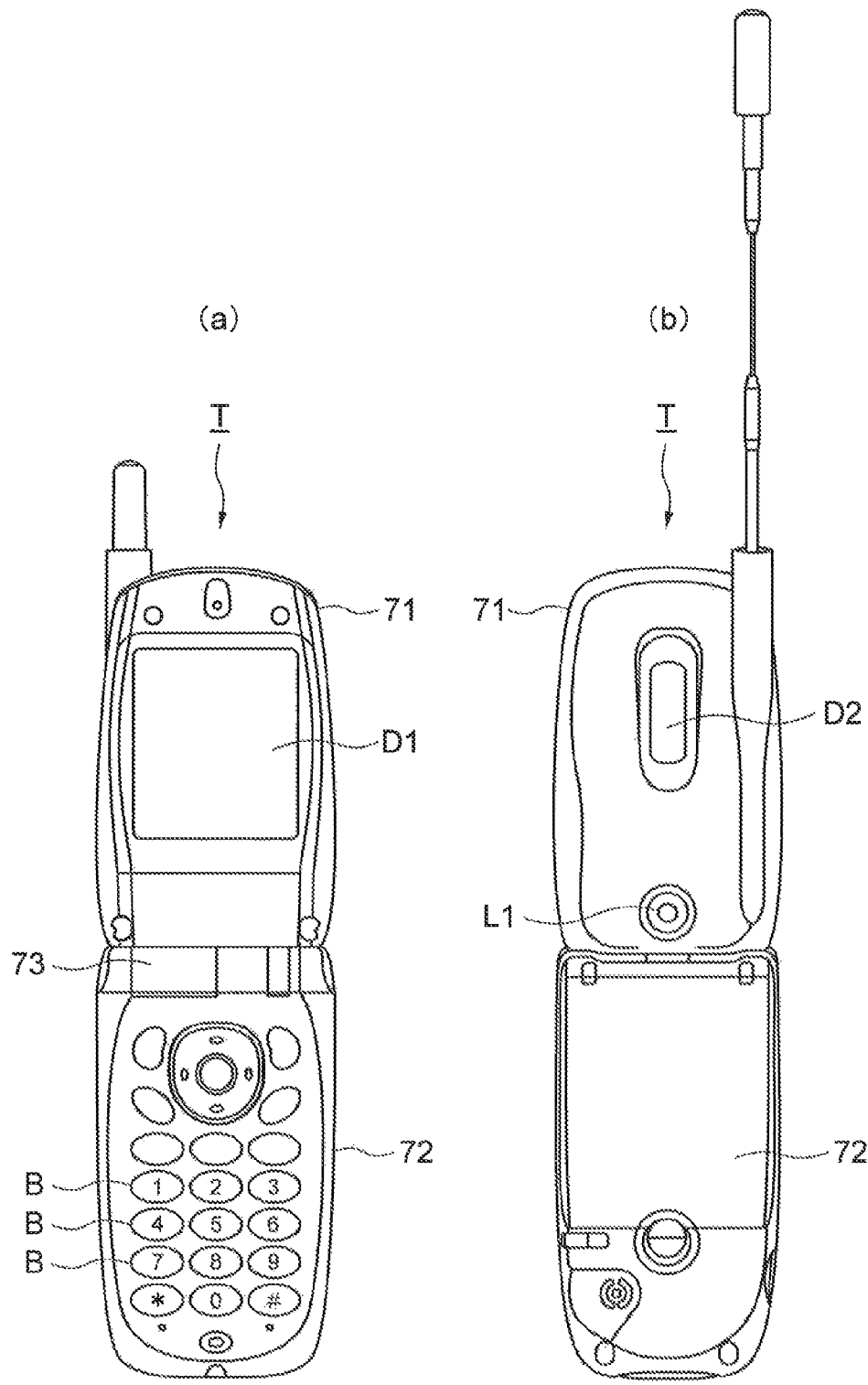
FIG. 3 is a representation of the external appearance of a mobile telephone including view (a) in which the folded mobile telephone has been unfolded and seen from inside and view (b) in which the folded mobile telephone has been unfolded and seen from outside.

Next, as an example of a portable terminal provided with an image pickup apparatus, a mobile telephone is described with reference to outline drawings of FIG. 3, in which FIG. 3(a) is a view representing a situation where the folded mobile telephone has been unfolded and seen from inside and FIG. 3(b) is a view representing a situation where the folded mobile telephone has been unfolded and seen from outside.

Referring to FIG. 3, the mobile telephone T includes an upper enclosure 71 which serves as a case provided with display screens D1, D2 and a lower enclosure 72 provided with operation buttons B, the upper enclosure 71 and the lower enclosure 72 being interconnected by a hinge 73. A camera module is incorporated in a portion of the upper enclosure 71 below the display screen D2 with the single lens L1 serving as an image pickup lens exposed on an outer surface of the upper enclosure 71.

Meanwhile, this image pickup apparatus may be located in a portion of the upper enclosure 71 above the display screen D2 or in a side surface thereof. Also, the mobile telephone T is not limited to a folding type.

EXAMPLES

Examples of the present invention are now described hereinbelow. The following symbols are used in the individual Examples:

f: focal length of an entire image pickup lens system
fB: back focus
F: F number
2Y: length of the diagonal of the imaging plane of the solid-state image pickup device
R: radius of curvature
D: on-axis surface distance
Nd: index of refraction with respect to a d-line of lens material
vd: Abbe number of lens material
w: half-image angle
TL: distance along the optical axis from a lens surface closest to an object to the imaging plane of the entire image pickup lens system In the individual Examples, each surface identified by an "*" immediately following a surface number is a surface having an aspherical shape which is expressed by equation 2 below, in which a peak point of the surface corresponds to an origin, an X-axis represents a direction of the optical axis, and h represents the height measured in a direction perpendicular to the optical axis:

$$X = \frac{h^2/R}{1 + \sqrt{1-(1+K)h^2/R^2}} = \sum A_i h^i \quad \text{[Equation 2]}$$

where
Ai: i-th order aspheric coefficient
R: paraxial radius of curvature
K: conic constant Meanwhile, concerning the aspheric coefficient, a power of 10 (e.g., $2.5 \times 10^{-02}$) is expressed by using "e" (e.g., 2.5e-002).

Figure 1:
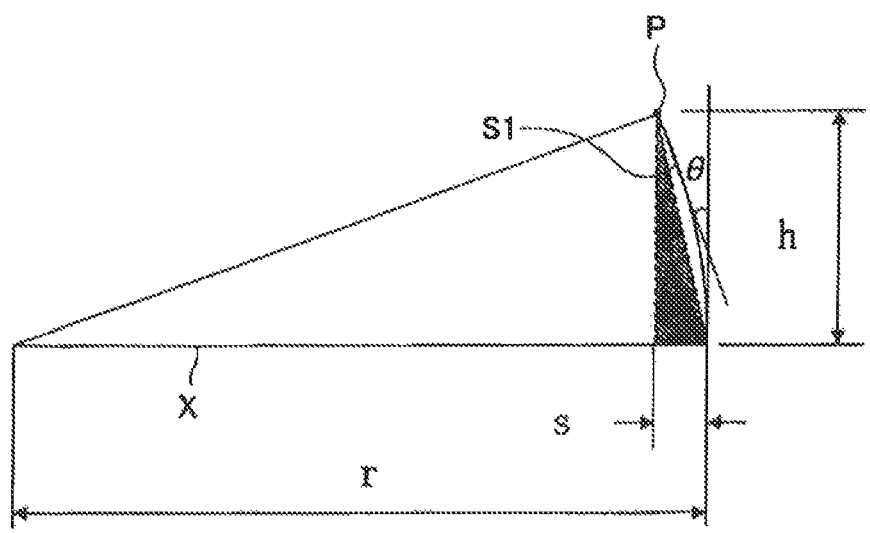
FIG. 1 is a diagram representing a cross section taken along an optical axis of an optical surface S1 for explaining a paraxial radius of curvature and an angle of surface inclination.

Now, the meaning of the paraxial radius of curvature referred to in the claims and Examples is explained. For actual measurement of a lens, it is possible to regard a local radius of curvature on a surface S1 in a paraxial region that is given by equation 3 below as the paraxial radius of curvature.

$$r = \{(h)2 + (s)2\}/(2s) \quad \text{[Equation 3]}$$

where, referring to FIG. 1, the individual symbols are defined as follows:
r: local radius of curvature
h: ⅒ of effective diameter
s: spacing between a foot of a perpendicular line drawn from the peak point of the surface at height h1 to the optical axis Also, the local radius of curvature of an actual lens can be determined from a measured amount of sag using a similar equation. Measurements may be performed by a contact method using the Ultra-high Accuracy Profilometer UA3P (manufactured by Panasonic Corporation) or by a non-contact method.

Meanwhile, although the parallel plate element F and imaging plane I are illustrated as being separately from each other in the cross-sectional diagrams representing the Examples, the parallel plate element F and the imaging plane I may be in close contact with each other.

Example 1

Figure 4:
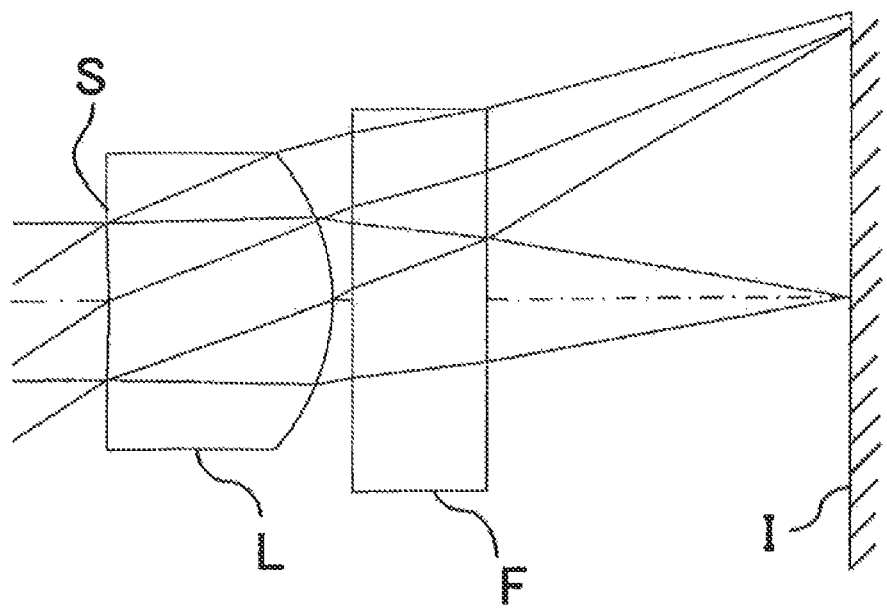
FIG. 4 is a cross-sectional diagram of an image pickup lens of Example 1.
Figure 5:
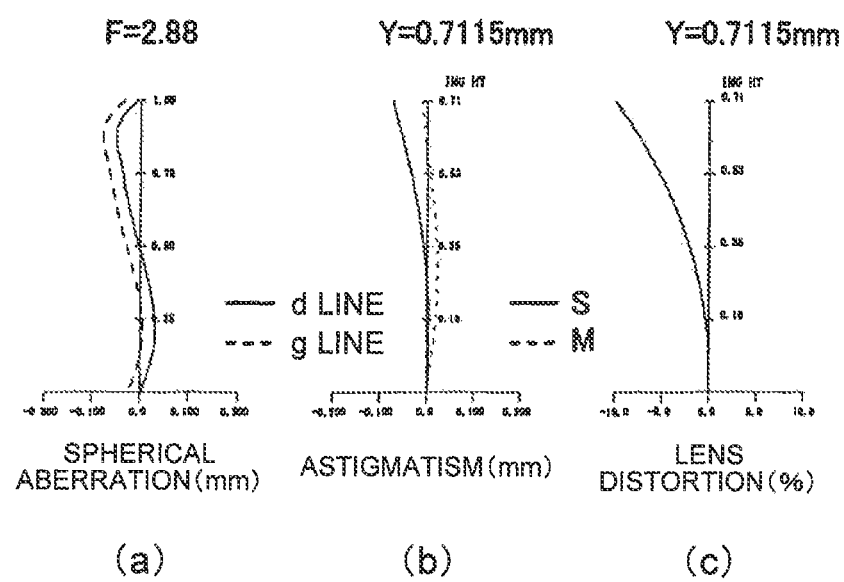
FIG. 5 is a representation of a spherical aberration chart (a), an astigmatism chart (b) and a lens distortion chart (c) of Example 1.

Given in Table 1 is lens data of Example 1. FIG. 4 is a cross-sectional diagram of an image, pickup lens of Example 1. FIG. 5 is a representation of a spherical aberration chart (a), an astigmatism chart, (b) and a lens distortion chart (c). In the spherical aberration chart, a solid line and a broken line represent the amounts of spherical aberration on the d-line and g-line, respectively, and in the astigmatism chart, a solid line and a broken line represent a sagittal surface and a meridional surface, respectively (the same shall apply hereafter). In FIG. 4, S indicates an aperture stop, F indicates a parallel plate element, L indicates a single lens, and I indicates an imaging plane. Here, designated by F is the parallel plate element which may be an optical low-pass filter, an IR cut filter, or seal glass of a solid-state image pickup device, for example. It is assumed that the solid-state image pickup device of this Example is a 1/12-inch CMOS image sensor having 640×480 pixels and 1.75-µm pixel pitch. To add to this, the single lens is made of energy-curable resin.

TABLE 1

| NUM. | R | D | Nd | vd | Effective dia. |
|------|---|---|----|----|----------------|
| OBJ  | ∞ | 400.0000 | | | |
| 1    | ∞ | 0.0500 | | | 0.2102 |
| STO* | −5.8747 | 0.5685 | 1.50000 | 56.99 | 0.2102 |
| 3*   | −0.5672 | 0.0514 | | | 0.3944 |
| 4    | ∞ | 0.3500 | 1.47140 | 65.19 | 0.4480 |
| 5    | ∞ | 0.9409 | | | 0.5099 |
| IMG  | ∞ | | | | |

ASPHERICAL SURFACE

2*  K = 5.00000e+001, A3 = −5.59418e−001, A4 = 4.48147e+000,
    A5 = 0.00000e+000, A6 = −8.24604e+001, A7 = 0.00000e+000,
    A8 = 2.36906e+002, A9 = 0.00000e+000, A10 = 4.90089e+003,
    A11 = 0.00000e+000, A12 = 1.29754e+005, A13 = 0.00000e+000,
    A14 = 7.14869e+005, A15 = 0.00000e+000, A16 = −7.64479e+007,
    A17 = 0.00000e+000, A18 = 0.00000e+000, A19 = 0.00000e+000,
    A20 = 0.00000e+000
3*  K = −1.98592e+000, A3 = 7.75007e−002, A4 = −1.24992e+000,
    A5 = 0.00000e+000, A6 = −3.23414e+000, A7 = 0.00000e+000,
    A8 = 2.92964e+001, A9 = 0.00000e+000, A10 = −5.06673e+001,
    A11 = 0.00000e+000, A12 = −8.61115e+001, A13 = 0.00000e+000,
    A14 = −2.65458e+002, A15 = 0.00000e+000,
    A16 = −9.46230e+002, A17 = 0.00000e+000, A18 = 1.34908e+004,
    A19 = 0.00000e+000, A20 = 0.00000e+000

| | |
|---|---|
| f | 1.2124 |
| F | 2.8900 |
| w | 33.39 |
| Y | 0.7115 |
| TL | 1.9608 |
| fB | 0.9409 |

Example 2

Figure 6:
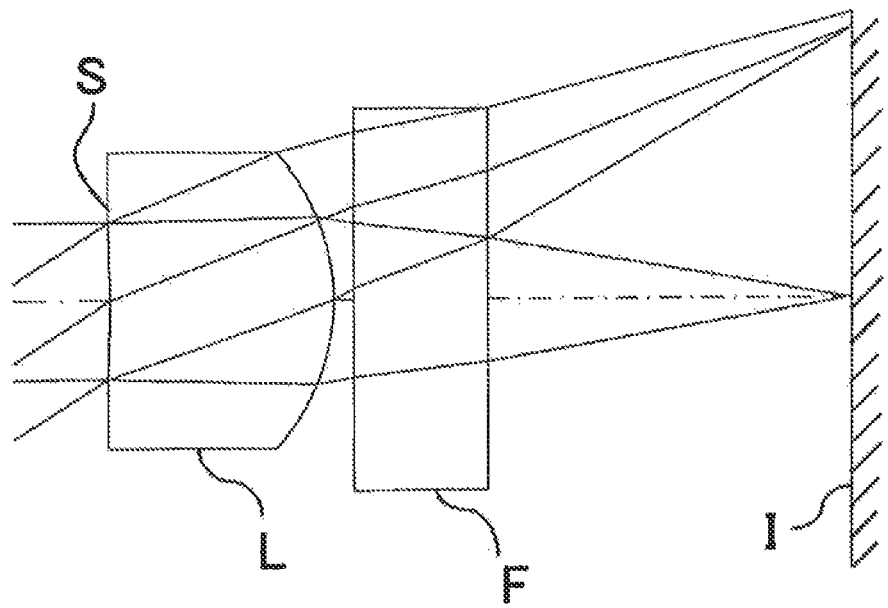
FIG. 6 is a cross-sectional diagram of an image pickup lens of Example 2.
Figure 7:
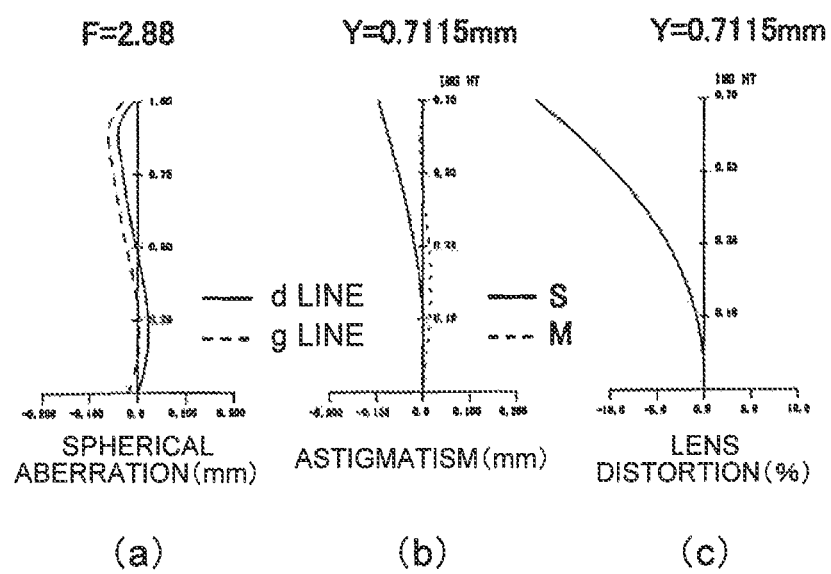
FIG. 7 is a representation of a spherical aberration, chart (a), an astigmatism, chart (b) and a lens distortion chart (c) of Example 2.

Given in Table 2 is lens data of Example 2. FIG. 6 is a cross-sectional diagram of an image pickup lens of Example 2. FIG. 7 is a representation of a spherical aberration chart (a), an astigmatism chart (b) and a lens distortion chart (c). In FIG. 6, S indicates an aperture stop, F indicates a parallel plate element, L indicates a single lens, and I indicates an imaging plane. Here, designated by F is the parallel plate element which may be an optical low-pass filter, an IR cut filter, or seal glass of a solid-state image pickup device, for example. It is assumed that the solid-state image pickup device of this Example is a 1/12-inch CMOS image sensor having 640×480 pixels and 1.75-µm pixel pitch. To add to this, the single lens is made of energy-curable resin.

TABLE 2

| NUM. | R | D | Nd | vd | Effective dia. |
|------|---|---|----|----|----------------|
| OBJ  | ∞ | 400.0000 | | | |
| 1    | ∞ | 0.0500 | | | 0.1636 |
| STO* | −4.5712 | 0.4120 | 1.50000 | 56.99 | 0.1636 |
| 3*   | −0.4394 | 0.0401 | | | 0.3227 |
| 4    | ∞ | 0.3800 | 1.47140 | 65.19 | 0.3933 |
| 5    | ∞ | 0.6537 | | | 0.4949 |
| IMG  | ∞ | | | | |

ASPHERICAL SURFACE

2*  K = 5.00000e+001, A3 = −9.19290e−001, A4 = 9.44049e+000,
    A5 = 0.00000e+000, A6 = −2.85454e+002, A7 = 0.00000e+000,
    A8 = 1.34767e+003, A9 = 0.00000e+000, A10 = 4.58140e+004,
    A11 = 0.00000e+000, A12 = 1.99324e+006, A13 = 0.00000e+000,
    A14 = 1.80461e+007, A15 = 0.00000e+000, A16 = −3.17130e+009,
    A17 = 0.00000e+000, A18 = 0.00000e+000, A19 = 0.00000e+000,
    A20 = 0.00000e+000
3*  K = −1.98592e+000, A3 = 1.15820e−001, A4 = −2.63303e+000,
    A5 = 0.00000e+000, A6 = −1.11956e+001, A7 = 0.00000e+000,
    A8 = 1.66656e+002, A9 = 0.00000e+000, A10 = −4.73643e+002,
    A11 = 0.00000e+000, A12 = −1.32282e+003, A13 = 0.00000e+000,
    A14 = −6.70119e+003, A15 = 0.00000e+000,
    A16 = −3.92526e+004, A17 = 0.00000e+000, A18 = 6.75457e+005,
    A19 = 0.00000e+000, A20 = 0.00000e+000

| | |
|---|---|
| f | 0.9411 |
| F | 2.8800 |
| w | 42.95 |
| Y | 0.7115 |
| TL | 1.5358 |
| fB | 0.6537 |

Example 3

Figure 8:
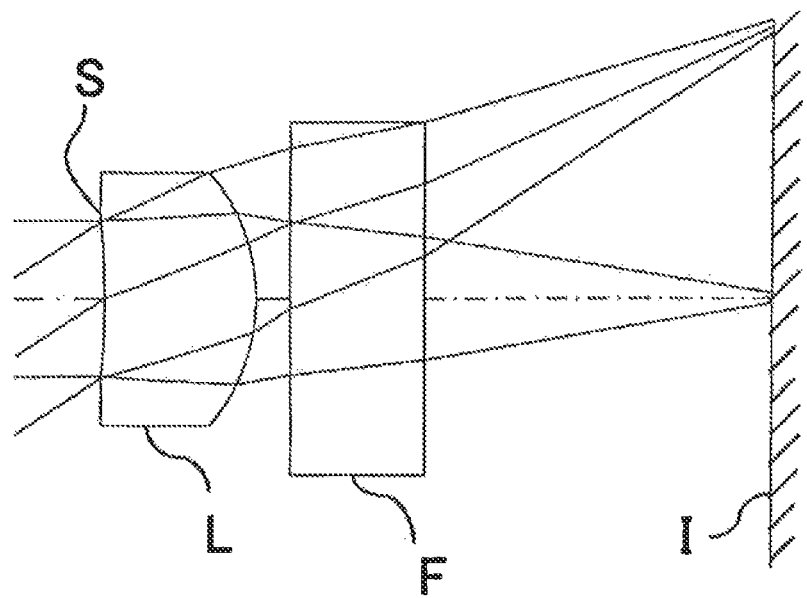
FIG. 8 is a cross-sectional diagram of an image pickup lens of Example 3.
Figure 9:
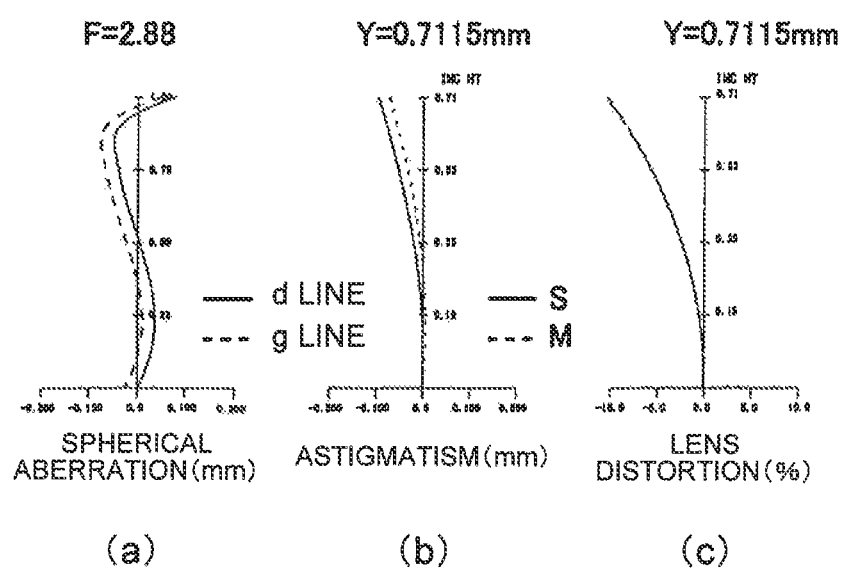
FIG. 9 is a representation of a spherical aberration chart (a), an astigmatism chart (b) and a lens distortion chart (c) of Example 3.

Given in Table 3 is lens data of Example 3. FIG. 8 is a cross-sectional diagram of an image pickup lens of Example 3. FIG. 9 is a representation of a spherical aberration chart (a), an astigmatism chart (b) and a lens distortion chart (c). In FIG. 8, S indicates an aperture stop, F indicates a parallel plate element, L indicates a single lens, and I indicates an imaging plane. Here, designated by F is the parallel plate element which may be an optical low-pass filter, an IR cut filter, or seal glass of a solid-state image pickup device, for example. It is assumed that the solid-state image pickup device of this Example is a 1/12-inch CMOS image sensor having 640×480 pixels and 1.75-µm pixel, pitch. To add to this, the single lens is made of energy-curable resin.

TABLE 3

| NUM. | R | D | Nd | vd | Effective dia. |
|------|---|---|----|----|----------------|
| OBJ  | ∞ | 400.0000 | | | |
| 1    | ∞ | 0.0500 | | | 0.2078 |
| STO* | −2.7936 | 0.3862 | 1.50000 | 56.99 | 0.2078 |
| 3*   | −0.5147 | 0.0878 | | | 0.3383 |
| 4    | ∞ | 0.3500 | 1.47140 | 65.19 | 0.4031 |

TABLE 3-continued

| | | | | |
|---|---|---|---|---|
| 5 | ∞ | 0.8973 | | 0.4724 |
| IMG | ∞ | | | |

ASPHERICAL SURFACE

2*  K = 1.79566e+001, A3 = −6.60944e−001, A4 = 4.34047e+000,
    A5 = 0.00000e+000, A6 = −8.19399e+001, A7 = 0.00000e+000,
    A8 = 2.31149e+002, A9 = 0.00000e+000, A10 = 4.18135e+003,
    A11 = 0.00000e+000, A12 = 1.03633e+005, A13 = 0.00000e+000,
    A14 = 1.47648e+004, A15 = 0.00000e+000, A16 = −9.18474e+007,
    A17 = 0.00000e+000, A18 = −0.00000e+000, A19 = 0.00000e+000,
    A20 = 0.00000e+000
3*  K = −1.53017e+000, A3 = 6.69766e−002, A4 = −1.50697e+000,
    A5 = 0.00000e+000, A6 = −5.05590e+000, A7 = 0.00000e+000,
    A8 = 2.07102e+001, A9 = 0.00000e+000, A10 = −8.41561e+001,
    A11 = 0.00000e+000, A12 = −1.46669e+002, A13 = 0.00000e+000,
    A14 = 1.00894e+002, A15 = 0.00000e+000, A16 = −1.79300e+003,
    A17 = 0.00000e+000, A18 = −1.73114e+005, A19 = 0.00000e+000,
    A20 = 0.00000e+000

| | |
|---|---|
| f | 1.1945 |
| F | 2.8800 |
| w | 34.02 |
| Y | 0.7115 |
| TL | 1.7713 |
| fB | 0.8973 |

Example 4

Figure 10:
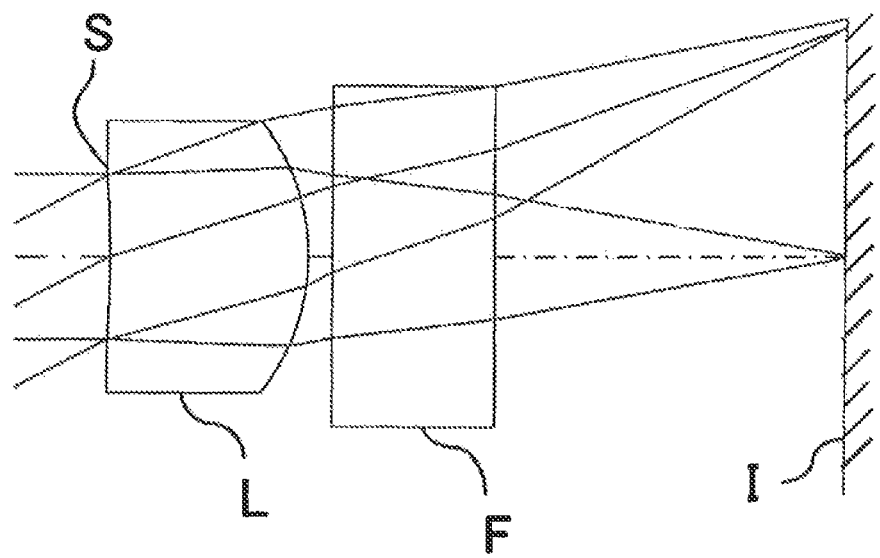
FIG. 10 is a cross-sectional diagram, of an image pickup lens of Example 4.
Figure 11:
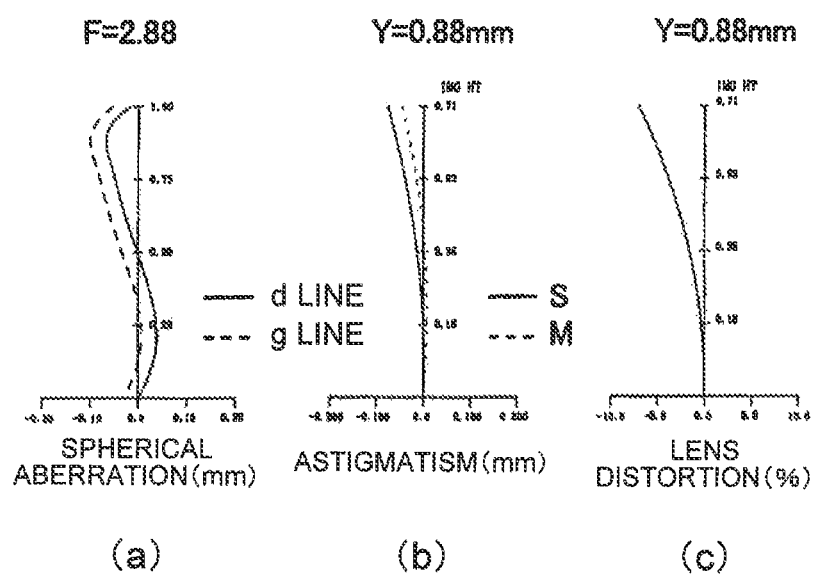
FIG. 11 is a representation of a spherical aberration chart (a), an astigmatism chart (b) and a lens distortion chart (c) of Example 4.

Given in Table 4 is lens data of Example 4. FIG. 10 is a cross-sectional diagram of an image pickup lens of Example 4. FIG. 11 is a representation of a spherical aberration chart (a), an astigmatism chart (b) and a lens distortion chart (c). In FIG. 10, S indicates an aperture stop, F indicates a parallel plate element, L indicates a single lens, and I indicates an imaging plane. Here, designated by F is the parallel plate element which may be an optical low-pass filter, an IR cut filter, or seal glass of a solid-state image pickup device, for example. It is assumed that, the solid-state image pickup device of this Example is a 1/10-inch CMOS image sensor having 640×430 pixels and 2.2-μm pixel pitch. To add to this, the single lens is made of energy-curable resin.

TABLE 4

SURF DATA

| NUM. | R | D | Nd | vd | Effective dia. |
|---|---|---|---|---|---|
| OBJ | ∞ | 400.0000 | | | |
| 1 | ∞ | 0.0600 | | | 0.2576 |
| STO* | −5.5922 | 0.5985 | 1.51000 | 56.99 | 0.2576 |
| 3* | −0.6891 | 0.0726 | | | 0.4558 |
| 4 | ∞ | 0.5000 | 1.47140 | 65.19 | 0.5256 |
| 5 | ∞ | 1.0809 | | | 0.6212 |
| IMG | ∞ | | | | |

ASPHERICAL SURFACE

2*  K = 5.00000e+001, A3 = −3.85949e−001, A4 = 2.28034e+000,
    A5 = 0.00000e+000, A6 = −2.84980e+001, A7 = 0.00000e+000,
    A8 = 5.45827e+001, A9 = 0.00000e+000, A10 = 7.49633e+002,
    A11 = 0.00000e+000, A12 = 1.25290e+004, A13 = 0.00000e+000,
    A14 = 3.88489e+004, A15 = 0.00000e+000, A16 = −3.33103e+006,
    A17 = 0.00000e+000, A18 = 0.00000e+000, A19 = 0.00000e+000,
    A20 = 0.00000e+000
3*  K = −1.81900e+000, A3 = 3.26561e−002, A4 = −6.97978e−001,
    A5 = 0.00000e+000, A6 = −1.23826e+000, A7 = 0.00000e+000,
    A8 = 6.12618e+000, A9 = 0.00000e+000, A10 = −8.72536e+000,
    A11 = 0.00000e+000, A12 = −1.21851e+001, A13 = 0.00000e+000,
    A14 = −2.25655e+001, A15 = 0.00000e+000, A16 = 1.20759e+001,
    A17 = 0.00000e+000, A18 = 1.09088e+003, A19 = 0.00000e+000,
    A20 = 0.00000e+000

TABLE 4-continued

| | |
|---|---|
| f | 1.4800 |
| F | 2.8800 |
| w | 34.24 |
| Y | 0.8800 |
| TL | 2.3120 |
| fB | 1.1260 |

Example 5

Figure 12:
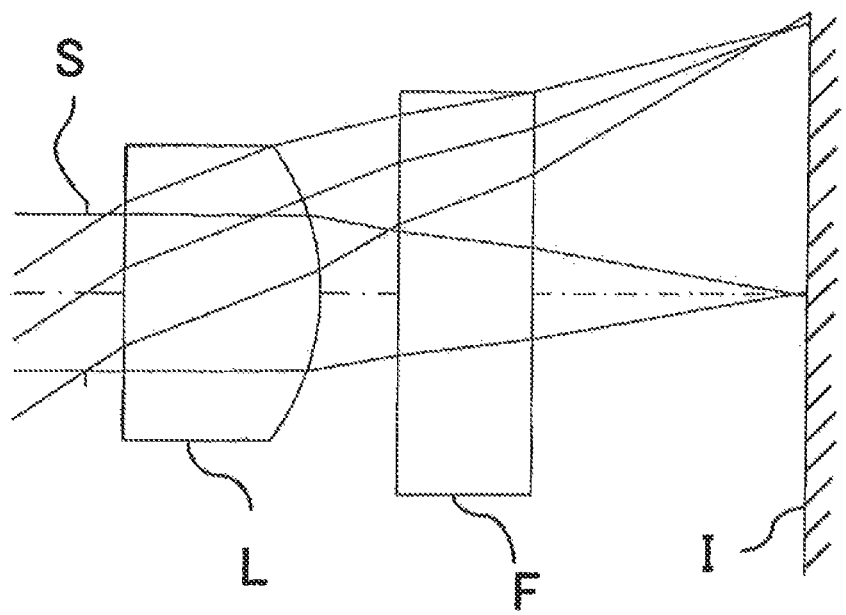
FIG. 12 is a cross-sectional diagram of an image pickup lens of Example 5.
Figure 13:
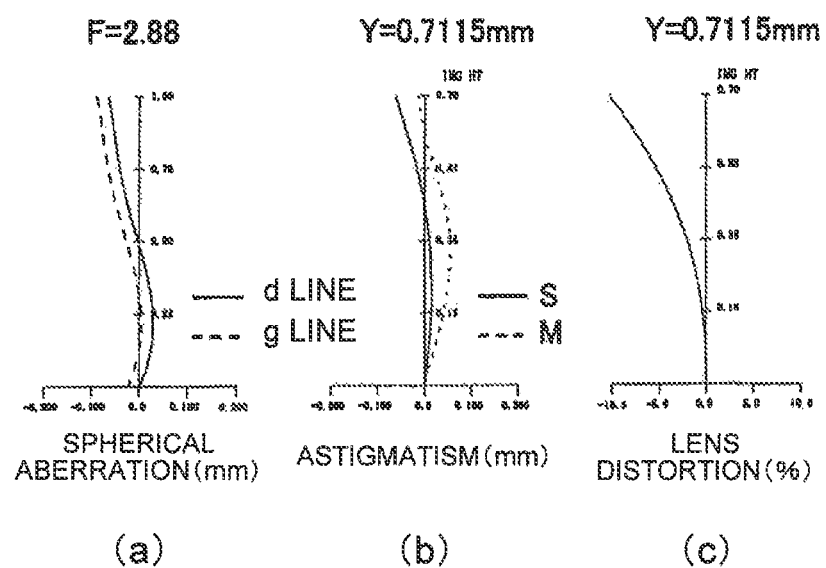
FIG. 13 is a representation of a spherical aberration chart (a), an astigmatism chart (b) and a lens distortion chart (c) of Example 5.

Given in Table 5 is lens data of Example 5. FIG. 12 is a cross-sectional diagram of an image pickup lens of Example 5. FIG. 13 is a representation of a spherical aberration chart (a), an astigmatism chart (b) and a lens distortion chart (c). In FIG. 12, S indicates an aperture stop, F indicates a parallel plate element, L indicates a single lens, and I indicates an imaging plane. Here, designated by F is the parallel plate element which may be an optical low-pass filter, an IR cut filter, or seal glass of a solid-state image pickup device, for example. It is assumed that the solid-state image pickup device of this Example is a 1/12-inch CMOS image sensor having 640×480 pixels and 1.75-μm pixel pitch. To add to this, the single lens is made of energy-curable resin.

TABLE 5

| NUM. | R | D | Nd | vd | Effective dia. |
|---|---|---|---|---|---|
| OBJ | ∞ | 400.0000 | | | |
| 1 | ∞ | 0.0500 | | | 0.2067 |
| STO | ∞ | 0.0450 | | | 0.2067 |
| 3* | 10.2134 | 0.5019 | 1.50000 | 56.99 | 0.2380 |
| 4* | −0.6203 | 0.2000 | | | 0.3861 |
| 5 | ∞ | 0.3500 | 1.47140 | 65.19 | 0.4687 |
| 6 | ∞ | 0.7051 | | | 0.5278 |
| IMG | ∞ | | | | |

ASPHERICAL SURFACE

3*  K = −5.00000e+001, A3 = −6.24651e−001, A4 = 5.03557e+000,
    A5 = 0.00000e+000, A6 = −8.51248e+001, A7 = 0.00000e+000,
    A8 = 1.28967e+003, A9 = 0.00000e+000, A10 = −5.21140e+004,
    A11 = 0.00000e+000, A12 = 1.70373e+006, A13 = 0.00000e+000,
    A14 = −2.65994e+007, A15 = 0.00000e+000, A16 = 1.59483e+008,
    A17 = 0.00000e+000, A18 = 0.00000e+000, A19 = 0.00000e+000,
    A20 = 0.00000e+000
4*  K = −2.93738e+000, A3 = 1.54932e−002, A4 = −1.11835e+000,
    A5 = 0.00000e+000, A6 = −3.31983e+000, A7 = 0.00000e+000,
    A8 = 2.98742e+001, A9 = 0.00000e+000, A10 = −3.02068e+001,
    A11 = 0.00000e+000, A12 = 9.02498e+001, A13 = 0.00000e+000,
    A14 = 4.22744e+002, A15 = 0.00000e+000, A16 = −2.25457e+003,
    A17 = 0.00000e+000, A18 = −6.76164e+004, A19 = 0.00000e+000,
    A20 = 0.00000e+000

| | |
|---|---|
| f | 1.1879 |
| F | 2.8800 |
| w | 34.10 |
| Y | 0.7115 |
| TL | 1.8520 |
| fB | 0.7051 |

Example 6

Figure 14:
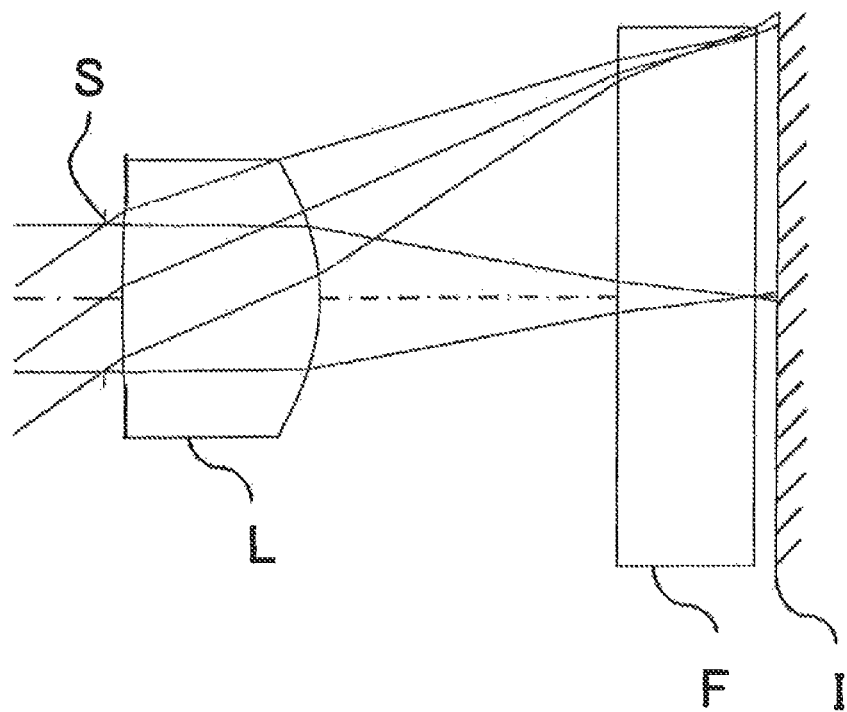
FIG. 14 is a cross-sectional diagram of an image pickup lens of Example 6.
Figure 15:
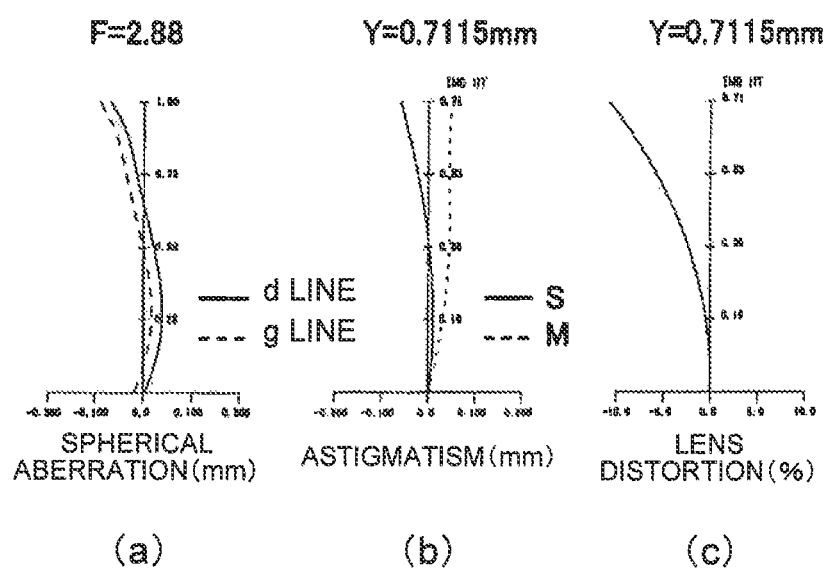
FIG. 15 is a representation of a spherical aberration chart (a), an astigmatism chart (b) and a lens distortion chart (c) of Example 6.

Given in Table 6 is lens data of Example 6. FIG. 14 is a cross-sectional diagram of an image pickup lens of Example 6. FIG. 15 is a representation of a spherical aberration chart (a), an astigmatism chart (b) and a lens distortion chart (c). In FIG. 14, S indicates an aperture stop, F indicates a parallel plate element, L indicates a single lens, and I indicates an imaging plane. Here, designated by F is the parallel plate element which may be an optical low-pass filter, an IR cut filter, or seal glass of a solid-state image pickup device, for example. It is assumed that the solid-state image pickup device of this Example is a 1/12-inch CMOS image sensor having 640×480 pixels and 1.75-μm pixel pitch. To add to this, the single lens is made of energy-curable resin.

TABLE 6

| NUM. | R | D | Nd | vd | Effective dia. |
|---|---|---|---|---|---|
| OBJ | ∞ | 400.0000 | | | |
| 1 | ∞ | 0.0500 | | | 0.1930 |
| STO | ∞ | 0.0450 | | | 0.1930 |
| 3* | 4.7745 | 0.5043 | 1.50000 | 56.99 | 0.2296 |
| 4* | −0.6056 | 0.7744 | | | 0.3623 |
| 5 | ∞ | 0.3500 | 1.47140 | 65.19 | 0.6197 |
| 6 | ∞ | 0.0613 | | | 0.6951 |
| IMG | ∞ | −0.0020 | | | |

ASPHERICAL SURFACE

3* K = 4.24845e+001, A3 = −7.21598e−001, A4 = 5.17330e+000,
A5 = 0.00000e+000, A6 = −8.15763e+001, A7 = 0.00000e+000,
A8 = 1.37735e+003, A9 = 0.00000e+000, A10 = −5.37641e+004,
A11 = 0.00000e+000, A12 = 1.67630e+006, A13 = 0.00000e+000,
A14 = −2.62939e+007, A15 = 0.00000e+000, A16 = 1.94978e+008,
A17 = 0.00000e+000, A18 = 0.00000e+000, A19 = 0.00000e+000,
A20 = 0.00000e+000
4* K = −2.24741e+000, A3 = 6.89964e−002, A4 = −9.91713e−001,
A5 = 0.00000e+000, A6 = −1.58868e+000, A7 = 0.00000e+000,
A8 = 3.08261e+001, A9 = 0.00000e+000, A10 = −8.46343e+001,
A11 = 0.00000e+000, A12 = 1.34137e+002, A13 = 0.00000e+000,
A14 = 5.95209e+002, A15 = 0.00000e+000, A16 = 3.21676e+003,
A17 = 0.00000e+000, A18 = 2.13353e+005, A19 = 0.00000e+000,
A20 = 0.00000e+000

| f | 1.1095 |
|---|---|
| F | 2.8800 |
| w | 35.69 |
| Y | 0.7115 |
| TL | 1.7830 |
| fB | 0.0593 |

Given in Table 7 are values for the individual Examples that satisfy the relevant conditional formulae.

TABLE 7

| | Example 1 | Example 2 | Example 3 | Example 4 | Example 5 | Example 6 |
|---|---|---|---|---|---|---|
| (1) f | 1.21 | 0.94 | 1.19 | 1.48 | 1.19 | 1.11 |
| (2) (r1 + r2)/(r1 − r2) | 1.21 | 1.21 | 1.45 | 1.28 | 0.89 | 0.77 |
| (3) θ1 | −5.02 | −4.96 | −10.45 | −6.24 | 0.81 | 9.59 |
| (4) dc/f | 0.29 | 0.40 | 0.29 | 0.34 | 0.29 | 0.32 |

While the back focus obtained is used for reducing influence on optical performance of dust that adheres to the image pickup lens and for obtaining the thickness of the parallel plate element in the Examples of the present invention, the back focus may be used for inserting an autofocusing unit or a correction unit.

Also, while the above-described Examples each, may include a single lens and a parallel plate element, the present invention includes in the scope thereof a structure in which a dummy lens having substantially no power (i.e., the reciprocal of the focal length) is further added.

INDUSTRIAL APPLICABILITY

According to the present invention, the invention can provide image pickup lenses that are best suited to high-volume production and size reduction. Portable terminals are not limited to mobile telephones.

REFERENCE SIGNS LIST

11 Lens frame
12 Printed circuit board
71 Upper enclosure
72 Lower enclosure
73 Hinge
B Operation buttons
C Image pickup device
D1, D2 Display screens
F Parallel plate element
L1 Single lens
S Aperture stop
T Mobile telephone

The invention claimed is:

1. An image pickup lens for focusing an image of a subject on a photoelectric converting portion of a solid-state image pickup device, the image pickup lens comprising an aperture stop and only a single lens element, wherein the single lens element of the image pickup lens is arranged between the aperture stop and the solid-state image pickup device, and wherein the image pickup lens satisfies the following conditional formulae:

$$0.70 \text{ mm} < f < 1.60 \text{ mm} \quad (1)$$

$$0.70 < (r1 - r2)/(r1 - r2) < 1.60 \quad (2)$$

where
 f: focal length of the image pickup lens (mm);
 r1: paraxial radius of curvature of an object-side surface of the single lens element (mm); and
 r2: paraxial radius of curvature of an image-side surface of the single lens element (mm).

2. The image pickup lens as recited in claim 1, wherein the image pickup lens satisfies the following condition:

$$-15° < θ1 < 10° \quad (3)$$

where θ1: angle of surface inclination (°) at a point of effective radius on the object-side surface of the single lens element, wherein the angle of surface inclination is an angle formed by a tangent line touching the object-side surface of the single lens element and a straight line perpendicular to an optical axis in a flat plane containing the optical axis, the angle of surface inclination being 0° at the optical axis position and being positive if the single lens element is convex on the object side.

3. The image pickup lens as recited in claim 1, wherein the single lens element is made of a material having heat resistance.

4. The image pickup lens as recited in claim 1, wherein the single lens element is made of energy-curable resin.

5. The image pickup lens as recited in claim 4, wherein the single lens element has a thickness of 1 mm or less on the optical axis.

6. The image pickup lens as recited in claim 1, wherein the image pickup lens further comprises at least one parallel plate element located on an image side of said single lens element, and the image pickup lens satisfies the following conditional formula:

$$0.25 < dc/f < 0.50 \quad (4)$$

where dc: thickness of the at least one parallel plate element (mm), wherein dc represents the sum of thicknesses if a plurality of parallel plate elements are provided.

7. The image pickup lens as recited in claim 1, wherein fine inorganic particles measuring 30 nanometers or less in size are dispersed in the resin material.

8. An image pickup apparatus employing the image pickup lens recited in claim 1.

9. A portable terminal comprising the image pickup apparatus recited in claim 8.

10. An image pickup lens for focusing an image of a subject on a photoelectric converting portion of a solid-state image pickup device, the image pickup lens comprising an aperture stop, only a single lens element, and a parallel plate element, wherein the single lens element is arranged between the aperture stop and the solid-state image pickup device, and the parallel plate element is arranged between the single lens element and the solid state image pickup device, and wherein the image pickup lens satisfies the following conditional formulae:

$$0.70 \text{ mm} < f < 1.60 \text{ mm} \quad (1)$$

$$0.70 < (r1+r2)/(r1-r2) < 1.60 \quad (2)$$

where
- $f$: focal length of the image pickup lens (mm);
- $r1$: paraxial radius of curvature of an object-side surface of the single lens element (mm); and
- $r2$: paraxial radius of curvature of an image-side surface of the single lens element (mm).

\* \* \* \* \*